United States Patent [19]

Froehlich et al.

[11] 4,176,382
[45] Nov. 27, 1979

[54] HIGH PERFORMANCE TAPE PATH FOR A 19 INCH TAPE RECORDER

[75] Inventors: Frederick B. Froehlich; Roy Hennings, both of Boulder; William J. Schaffer, Loveland, all of Colo.

[73] Assignee: International Business Machines Corporation, Armonk, N.Y.

[21] Appl. No.: 908,491

[22] Filed: May 22, 1978

[51] Int. Cl.² .................. G11B 15/58; G11B 15/66
[52] U.S. Cl. ................................. 360/95; 242/182; 360/130.21
[58] Field of Search .............. 360/95, 130, 90, 96, 360/83–85, 130.2, 130.21; 242/182–185

[56] References Cited

U.S. PATENT DOCUMENTS

| | | | |
|---|---|---|---|
| 3,057,568 | 5/1952 | Weidenhammer et al. | 242/182 |
| 3,057,569 | 5/1952 | Weidenhammer | 242/182 |
| 3,380,682 | 4/1968 | Georgantas et al. | 242/182 |
| 3,393,878 | 7/1968 | Aweida et al. | 242/182 |
| 3,645,472 | 2/1972 | Audeh | 242/182 |
| 3,863,863 | 2/1975 | Ende | 242/182 |
| 3,889,901 | 6/1975 | Hoyer | 242/209 |
| 3,910,526 | 10/1975 | Mosciatti | 360/130 |
| 3,948,459 | 4/1976 | Schoeneman | 242/182 |
| 3,952,968 | 4/1976 | McKinstry et al. | 242/182 |
| 4,019,694 | 4/1977 | Fare et al. | 242/182 |
| 4,093,148 | 6/1978 | Urynowicz | 242/182 |

FOREIGN PATENT DOCUMENTS

2010552 5/1973 Fed. Rep. of Germany ............. 360/95

Primary Examiner—Alfred H. Eddleman
Attorney, Agent, or Firm—James A. Pershon; Joscelyn G. Cockburn

[57] ABSTRACT

A high performance self threading tape transport apparatus is packaged within a stand alone 19 inch wide frame. The tape transport apparatus includes a removable file reel and a machine reel. The removable file reel and the machine reel are arranged diagonally with a gravity assisted tape threading path. A single capstan is positioned adjacent the tape threading path with a pair of vacuum chambers situated one on each side of the capstan. The vacuum columns are offset relative to each other but incline to the tape threading path. A processing station including a magnetic transducer, is displaced relative to the tape threading path and operates to read magnetic data from the tape or to write magnetic data on the tape.

4 Claims, 2 Drawing Figures

HIGH PERFORMANCE TAPE PATH FOR A 19 INCH TAPE RECORDER

BACKGROUND OF THE INVENTION

1. Field of the Invention

The invention relates to digital magnetic tape transport unit and more particularly to a configuration which allows a high performance self threading tape transport unit to be packaged within a standardized relatively small mounting rack.

2. Prior Art

The use of high performance magnetic tape transport unit for feeding magnetic tape through a processing station so as to read digital data from the magnetic tape or to write digital data onto said magnetic tape is well known in the prior art. Prior art magnetic tape transport units are packaged in a parallelogram type mounting rack. The tape transport unit comprises a machine reel and file reel mounted to the mounting rack so that the axis of rotation for each reel is on a straight line parallel to and adjacent to one reference side or reference edge of the mounting rack. One or more drive capstan and a processing station, which usually includes a read/write head, are positioned on the side of the straight line farthest away from the reference side or reference edge. A pair of vacuum chambers are positioned one on each side of the processing station with major axis running in a direction parallel to the length of each vacuum column and perpendicular to the straight line.

In order to satisfy the high data throughput, (be it reading and/or writing) for the high performance tape transport unit, the magnetic tape is transported intermittently and bidirectionally at relatively high speeds past the read/write head, by the capstan. In order to minimize the adverse effect of the reels inertia on the rapidity with which the capstan moves the tape an optimum length or loop of tape is maintained in each of the vacuum chambers. By isolating the inertia of the reels from the drive capstan the effective mass which the drive capstan is constrained to move, is the mass resulting from the effective length of tape extending from the midpoints of the vacuum chambers and through the processing station.

Due to the rapidity with which the capstan moves the effective length of tape, the vacuum chambers are constrained to be designed with an optimum length. The length is such that the capstan will not pull the tape out of the vacuum chamber during system operation. To meet the optimum length requirement the mounting frame or rack of prior art high performance tape transport units are usually rectangular with the vacuum chambers running parallel to the long sides of the rectangular frame. A more detailed description of configurations for prior art high performance tape transport units are given in U.S. Pat. Nos. 3,057,568 and 3,057,569.

Although the prior art high performance tape transport units function satisfactorily for their intended purpose, these devices tend to be relatively large and, therefore, occupy an unusual amount of space. The relatively large size of prior art tape transport unit is the result of the linearly spaced machine and file reels coupled with the relatively long vacuum chambers which are positioned so that the major axis for each chamber is perpendicular to the line joining the axis of rotation for each reel.

Several attempts have been made in the prior art to arrange the necessary elements of a high performance tape transport unit to fit a standard industry size mounting frame.

In one of the prior art arrangements a machine reel and a file reel are positioned so that the axis about which the reels rotate are located on a straight line which is parallel to one edge of the support frame. A relatively straight line tape threading path with a plurality of tape guides are positioned below the reels. A magnetic head is positioned on one side of the tape threading path while a capstan is situated on the opposite side of the tape threading path. A pair of vacuum chambers are asymmetrically disposed relative to and on the capstan side of the tape threading path. The vacuum chambers have similar but differing inclination to provide maximum chamber length as well as sufficient wrap on the capstan to prevent slippage. Although this device is an improvement over the prior art device in that the size of the tape transport unit is reduced it has one drawback. Particularly, this configuration does not lend itself easily to automatic threading due to the fact that the magnetic transducer is positioned within the tape threading path. A more detailed description of the aforementioned device is given in U.S. Pat. No. 3,645,472.

In another type of prior art configuration aimed at minimizing the size of the mounting frame of a high performance tape transport device the essential elements (for example, capstans, guides, vacuum chambers, and magnetic heads) are arranged in two parallel planes. The transport consists of a mounting panel upon which the essential elements are mounted. The principal operative path of the tape transport is positioned in a first predetermined plane adjacent to and at right angles to the surface of the mounting panel. The essential elements in the principal operative path consist of a magnetic head and a first pair of guide rollers, positioned one on each side of the magnetic head and arranged parallel to one side of the mounting panel. A pair of vacuum chambers are arranged in a V configuration with the closed ends together and the open ends lying one on each side of the first pair of guide rollers along the principal operative path. A machine reel and a file reel are mounted with the rotational axis for each reel position in horizontal alignment and parallel to one side of the mounting panel. The machine reel and the file reel lie in a second predetermined plane which is superimposed above and parallel to the first predetermined plane. The orientation of the reels is such that the rotational axis for each reel is outside of the V defined by the chambers but the vacuum chambers are overlapped by the reels. Translational guide rollers are used to guide the tape from the first plane to the second plane. A more detailed description of this system is given in U.S. Pat. No. 3,380,682.

Although the aforementioned types of devices reduce the size of the prior art tape transport unit, it does not lend itself to automatic (i.e., self) threading. The reason is that the tape threading path is circuitous and complicated. Moreover, the overall cost of the system tends to be relatively high due to the use of translational guides and dual capstans.

In yet another type of prior art configuration, compactness is achieved by mounting a machine reel and a file reel on a line parallel to one side of a mounting frame. A pair of vacuum chambers are positioned in side by side relationship below the reels and parallel to the line. The vacuum columns are oriented in a head and tail manner (i.e., the open end of each vacuum column is positioned adjacent to the closed end of the other). A more detailed discussion of this type of configuration is given in U.S. Pat. Nos. 3,863,863 and 3,952,968. Due to the orientation of the vacuum columns the effective length of tape which the capstan moves increases. As the effective length of tape increases, so does the mass. The net result is that the system throughput is degraded since the acceleration of the capstan is reduced due to the increased mass of tape.

SUMMARY OF THE INVENTION

In accordance with the present invention the above enumerated prior art problems are solved by a unique unobvious configuration which allows a high performance self threading tape transport unit to be packaged in a standard industry size frame.

Specifically, the automatic (i.e. self) threading high performance tape device includes a mounting frame. A machine reel and a file reel are mounted so that the center of rotation for each reel is located on a diagonal line. The machine reel and the file reel are joined by a relatively vertical but curved tape threading path or channel. The tape threading path is defined by two guide rollers and pieces of channel member fastened in contiguous relationship to form a substantially contiguous guide channel. Due to the substantially vertical orientation of the tape threading path, gravity is utilized to assist in threading the tape. A plurality of air jets are also disposed along the channel and further help to propel the tape along the path.

A first vacuum chamber having a closed end and an open end with elongated sides is arranged symmetrically about a major axis running between the open and the closed end and inclined at a first angle to the tape threading path. A second vacuum chamber having a closed end and an open end with a pair of elongated sides is arranged symmetrically about a major axis extending between the open end and the closed end and inclined at a second angle to the tape threading path. The closed end of the second vacuum chamber is displaced from the closed end of the first vacuum chamber with the displacement being in a direction towards the tape threading path. The displaced vacuum chamber is then rotated about its closed end so that one of the elongated sides of the second vacuum chamber and one of the elongated sides of the first vacuum chamber form an arcuate tape path along which a tape cleaner, magnetic head, etc. are positioned.

A bidirectional capstan is positioned within the arcuate tape path so that the surface is in linear alignment with the arcuate tape path and the side of the vacuum chamber which defines the arcuate tape path. A pair of guides are positioned one at the entry to the first vacuum chamber and the other at the exit of the second vacuum chamber.

In one feature of the invention, vent holes are fabricated along the tape threading channel.

The foregoing and other features and advantages of the invention will be apparent from the following more particular description of preferred embodiments of the invention, as illustrated in the accompanying drawings.

DESCRIPTION OF THE PREFERRED EMBODIMENTS

Figure 1:
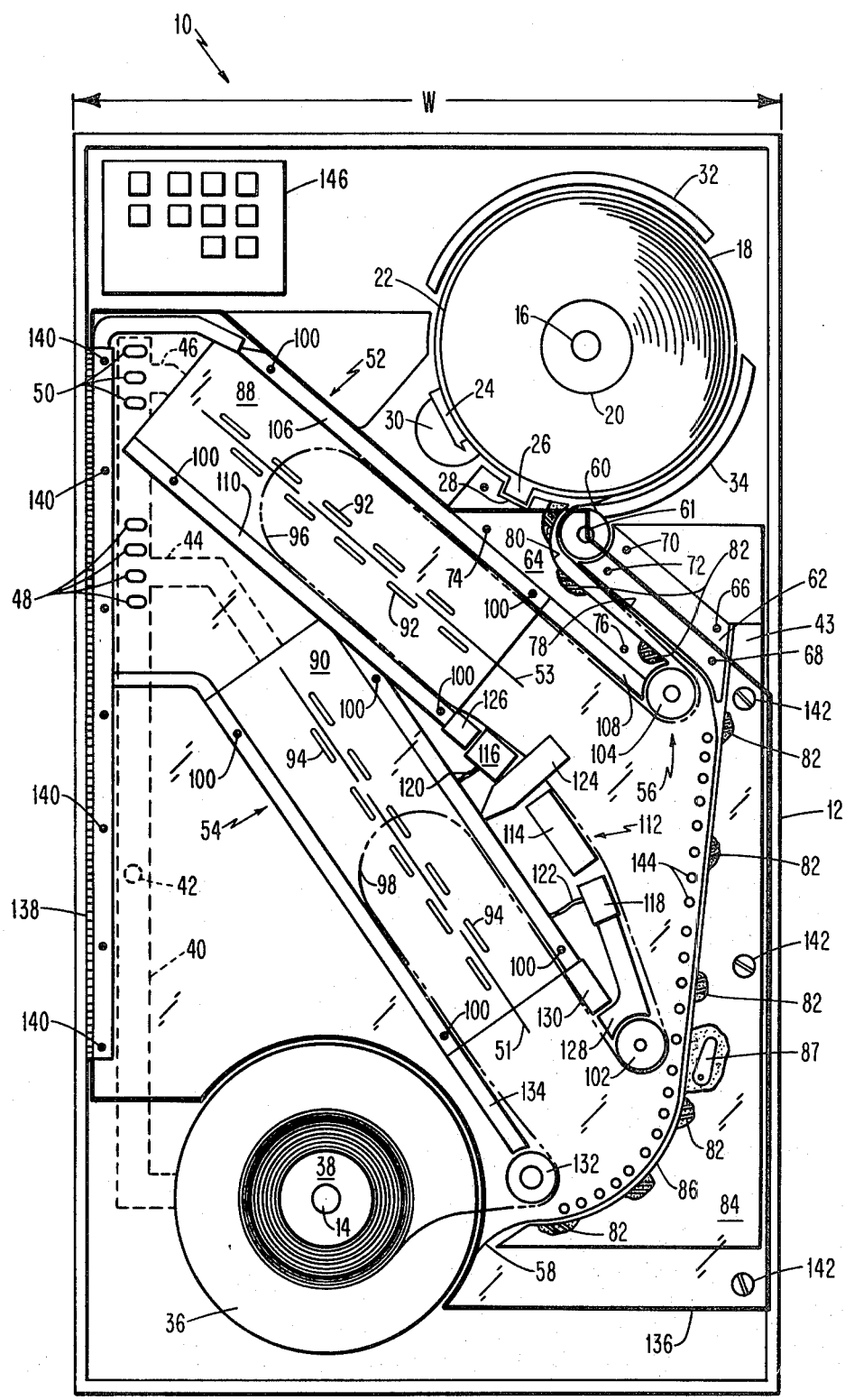
FIG. 1 is a schematic representation of a self threading version of a tape transport device in accordance with the present invention.

In order to simplify the description of the present invention, like elements in the drawings will be assigned common numerals.

A magnetic tape transport unit in accordance with the present invention moves magnetic tape along a relatively vertical tape threading path positioned between a file reel and a machine reel. The tape is then guided along an arcuate tape processing path whereby data is written on or written from the length of media by a magnetic transducer.

Figure 2:
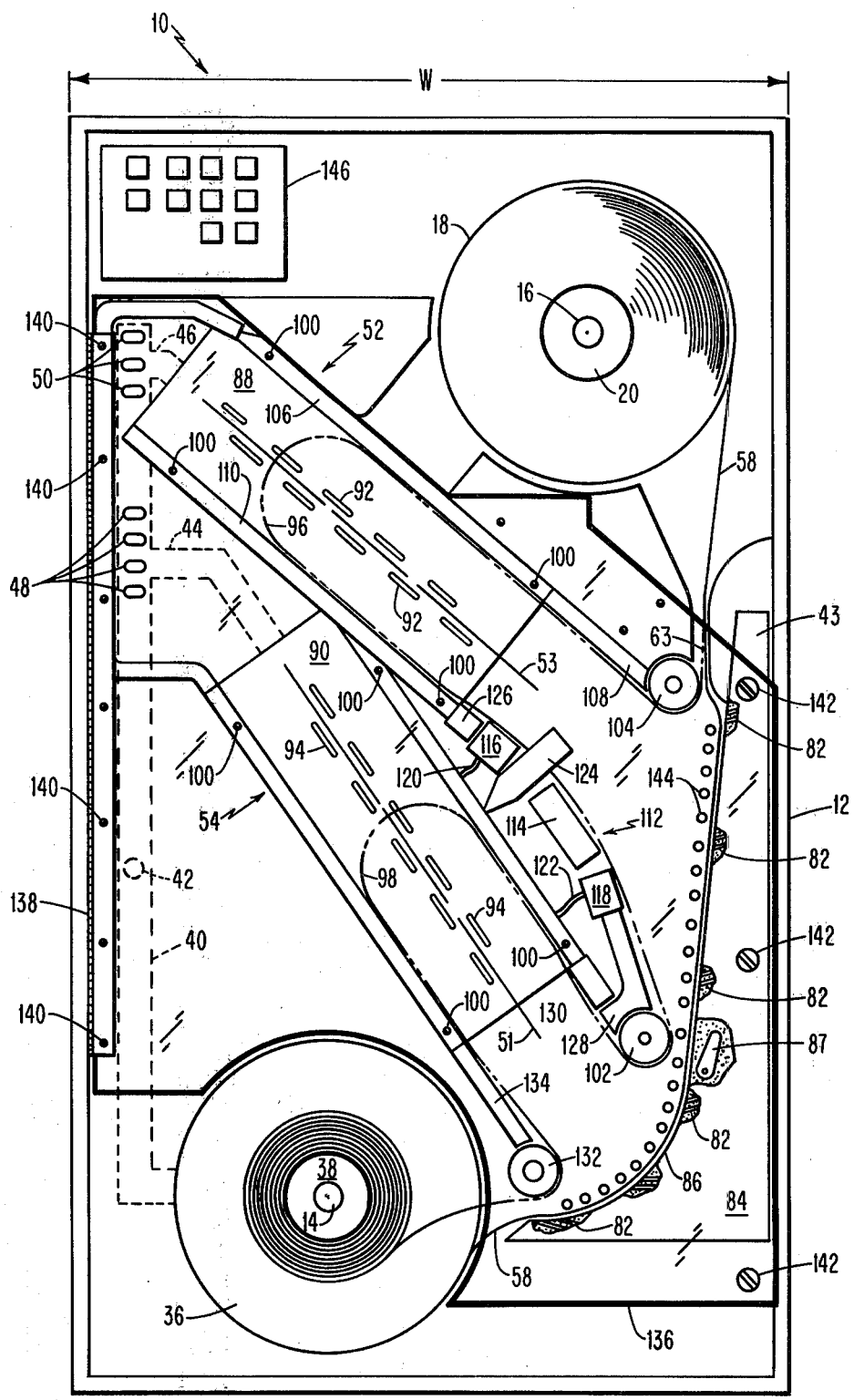
FIG. 2 is a schematic representation of a semi-self threading version of a tape transport device in accordance with the present invention.

Referring now to FIGS. 1 and 2, high performance tape transport unit 10 comprises a standardized mounting frame 12. As is used hereinafter, the term standardized means that the width (W) of the mounting frame is less than but not greater than 19 inches.

As is used hereinafter, the term high performance tape transport unit means a tape transport unit having a minimum linear speed of 125 inches per second. Alternately, the high term performance tape transport unit means a tape transport unit wherein the minimum linear density is 6250 bits per inch (BPI).

Referring again to FIGS. 1 and 2 the tape transport unit shown in FIG. 1 is an automatic or self threading unit while the tape transport unit shown in FIG. 2 is a semi-automatic or manual threading unit. A typical configuration in accordance with the teaching of the present invention is shown in the drawings. Mounting frame 12 has a rectangular shape with the long sides of the rectangular frame mounted in a vertical fashion while the width or short sides of the mounting frame runs horizontally and perpendicular to the long sides. In normal operation, the machine is mounted so that the long sides are positioned within the vertical plane. For description purposes, it will be assumed that the tape transport unit is mounted in its normal operation position. However, the orientation should not be construed as a limitation on the scope of the invention; since it is well within the skill of the art to change the orientation of the tape transport without departing from the scope of this invention. Driving spindles 14 and 16 are connected to a pair of driving motors (not shown) so that the spindle protrudes above the surface of mounting frame 12 while the driving motors extend from the backside of frame 12. Movable file reel 18 is mounted onto drive spindle 16. As will be explained subsequently, by energizing the drive motor which is attached to spindle 16, the movable machine reel is rotated in a clockwise or counterclockwise direction. Of course, the direction of rotation depends on the energization current which is supplied to the motor. The movable file reel includes a hub portion 20 and a pair of flanges mounted to the hub portion in the conventional manner. A length of flexible conventional magnetic tape is coiled onto the hub of file reel 18. A wraparound cartridge 22 is positioned between the reel flanges to encircle the coiled magnetic tape. The wraparound cartridge includes a latching mechanism 24 and a locating projection 26. Notch 28 is fabricated on mounting frame 12. A pin (not shown) is attached to a sensor means (not shown) and positioned so that the pin projects above the recessed surface of notch 28, while the sensor means projects from the backside of the mounting frame. As will be explained subsequently, when the movable file reel is mounted onto spindle 16 with the projection 26 in alignment with notch 28 the indicating pin (not shown) is pushed in a direction perpendicular to the recessed surface of notch 28. The pin then activates the sensor mechanism located on the backside of the mounting panel which is an indication that a cartridge is mounted onto the tape transport unit. Opening mechanism 30 is mounted onto frame 12. The opening mechanism includes a rotary motor mounted on the back side of the mounting frame 12 and an opening pin (not shown) which projects above the surface of the mounting frame. Whenever a movable file reel is mounted onto spindle 16, the opening pin engages latching mechanism 24 and by moving the latch in a circular pattern the wraparound cartridge opens to release the file reel with its associated tape thereon. A pair of restraining members 32 and 34 are positioned symmetrically about spindle 16. Whenever the wraparound cartridge is opened by the opening mechanism, the wraparound cartridge is held by the restraining members while the tape is threaded out of the cartridge and into the vertical tape threading path. Since the cartridge does not form part of the present invention, it will not be discussed any further. However, a more detailed description is given in U.S. Pat. Nos. 3,371,882 and 3,620,478 and IBM Technical Disclosure Bulletin, Volume 14, No. 2, July 1971 pp398.

Still referring to FIGS. 1 and 2 a machine reel 36 is mounted on spindle 14. Spindles 14 and 16 are positioned so that the center line for both spindles lies on a diagonal line. Since spindle 16 and spindle 14 are positioned on a single diagonal line and movable file reel 18 and machine reel 36 are seated on spindles 16 and 14, respectively, then the reels are also lying on a diagonal line. Stated another way, the file reel and the machine reel are seated on a single or common diagonal line. By mounting the file reel unit the machine reel on a diagonal line the size of mounting frame 12 is reduced to a smaller size than was heretofore possible. The movable file reel and the fixed machine reel are conventional tape reels with each having a diameter of approximately 10½ inches. Also by positioning the reels on the diagonal line which is a configuration in contradistinction to prior art tape transport units, a high performance tape transport unit is packaged in a standardized mounting frame.

Similar to file reel 18 the machine reel includes hub portion 38 with a pair of spaced apart flanges. A plurality of air holes (not shown) are fabricated on the surface of the hub portion. Alternately, the hub portion may be fabricated from a porous material. Vacuum to the hub is supplied via vacuum line 40. The broken line indicates that the vacuum system cannot be seen from the front of the tape transport unit. In other words, the vacuum system is on the backside of the mounting frame. Low pressure fluid, preferably air, is supplied to the vacuum line via vacuum entry port 42. Vacuum entry port 42 is connected to a vacuum pump not shown. When the vacuum is on in vacuum line 40 a low pressure surrounds hub 38. As a result of this low pressure, the leading end of tape 58 which is positioned in section 43 of the tape threading part is attracted to the hub of the machine reel. Once the leading end of the tape is attached to the hub, the machine reel is rotated to form a few wraps of tape on said hub. At the completion of the tape attachment, the vacuum under the control of the machine logic is transferred from vacuum line 40 into vacuum line 44 and 46, respectively. As will be explained subsequently, the vacuum in vacuum lines 46 and 44 are used for loading vacuum chambers 52 and 54, respectively. A more detailed description of a machine reel and its associated pneumatics which are suitable for use in the environment of the present invention is given in U.S. Pat. No. 3,393,878.

Still referring to FIGS. 1 and 2, a tape threading path comprising two sections, namely sections 56 and 43 in FIG. 1 but only section 43 in FIG. 2 interconnect the machine reel and the file reel. Although evident from the drawings, it is worthwhile noting that the tape transport unit shown in FIG. 2 does not have the necessary element previously described relative to FIG. 1 which allows for automatic threading. To this end, whenever movable file reel 18 is loaded on the machine shown in FIG. 2, the operator has to rotate the file reel until the leading end of tape 58 falls into nip 63. At this point, the threading of the tape, until it attaches to machine reel 36, is done automatically. Due to the manual intervention which is necessary for threading the device shown in FIG. 2, the machine is characterized as semi-automatic. It is worthwhile noting that the apparatus shown in FIGS. 1 and 2 as a substantially vertical tape threading path and, as such, gravity assists in transporting the tape through the tape threading path.

Referring to FIG. 1 for the moment, the substantially vertical tape threading path which interconnects the diagonally positioned machine and file reels includes a first tape threading section 56. A first guide means 60 is journaled on shaft 61 and is positioned at the point where the leading end of the tape exits the file reel and at the entrance to the first tape threading section. Although a variety of tape guiding means can be used for guiding, in the preferred embodiment of this invention, the tape guiding means is a roller guide with flanges for guiding the edges of tape 58. The first tape threading section 56 of the tape path is formed by first channel member 62 and second channel member 64. The channel members are positioned in spaced apart relationship to define a channel therebetween. The channel members are attached to the mounting frame by screw means 66, 68, 70, 72, 74 and 76 respectively. The first channel member is characterized by a concave surface fabricated on one end. The concave surface is positioned about but in spaced relationship to the first guide means. The other end of the first channel member is characterized by a slant profile while surface 78 along which the tape is guided is characterized by a relatively straight section joining and extending from the concave end with a contiguous but slightly curved guiding edge adjoining the slant end of the first channel member. With this configuration, as the tape is guided or travels along edge 78, the slightly curved portion propels the tape against surface 86 of the second tape threading section 43.

Second channel member 64 is characterized by guiding surface or guiding edge 80. The guiding surface is J-shaped with the curved portion of the J positioned in proximity with first guide means 60 and opposite to the concave end of first channel member 62; while the linear section of the J shaped guiding surface is positioned in spaced apart relationship to guide surface 78. A plurality of angled air jets 82 are positioned along guide surface 80. By activating the air jets a fluid, preferably air, is blown into the first section of the tape threading path and helps to propel the tape 58 along the tape threading path.

In an alternate embodiment of the invention shown in FIG. 1, the first tape threading section 62, and second channel member 64, are arranged in linear vertical alignment with the second tape threading section 43 to define a vertical tape path. In this embodiment, the elements (such as restraining members 32 and 34, opening mechanism 30, first guide means 60, etc.) which allow for the automatic threading features of the tape transport unit are arranged about the periphery of the file reel to allow automatic threading.

Referring now to FIGS. 1 and 2, the second portion of the tape threading path is defined by third channel member 84. The third channel member is mounted to mounting frame 12. The third channel member is characterized by guide surface. Guide surface 86 has a linear section contiguous with a curved section. The third channel member is mounted so that the linear surface is positioned approximate to the slant end of first channel member 62; and the curved section is positioned in the vicinity of the machine reel. As is evident from the drawings, due to the fact that the tape threading path is substantially vertical, gravity assists in pulling the tape throughout the path. As is used in this specification, tape threading path means the channel which the tape is threaded from the file reel until it attaches onto the machine reel. A second set of angled air jets identified as element 82 are positioned along tape guiding surface 86. The angled air jets help in propelling the tape along the guide channel.

A loading means 87 is rotatably connected to a solenoid (not shown). In the preferred embodiment of this invention, the loading means is a finger like projection which is rotated whenever the solenoid is activated to contact the capstan and clamp the tape against said capstan. By holding the tape stationary on the capstan, the vacuum chambers are loaded in an orderly manner without pulling the tape out of each other.

Still referring to FIGS. 1 and 2, vacuum chambers 52 and 54 are positioned so major axis 51 and 53, respectively, which run between the closed end and the open end of each vacuum chamber are inclined at different angles to the tape threading path. Stated another way, each of the vacuum chambers has a closed end and an open end. The vacuum columns are positioned at an inclined angle relative to the tape threading path with the open end facing but offset from said tape threading path. Identical capacitive tape sensing units 88 and 90, respectively, are fastened into the vacuum chambers. A plurality of vacuum outlets 92 and 94, respectively, are fabricated on the top surface of each capacitive tape sensing unit. Since the capacitive tape sensing unit does not form part of the present invention, it will not be described in any further detail. Suffice it to say that the capacitive tape sensing unit senses on a continuous basis the position of tape loop 96 and 98 within its respective vacuum chamber. Although a plurality of means can be used for fastening the capacitive sensing unit into the vacuum chambers in the preferred embodiment of the present invention a plurality of screws 100 are used. Vacuum chamber 54 is displaced or offset relative to vacuum chamber 52. The displacement is in a direction towards the tape threading path; with the closed end of vacuum chamber 54 displaced relative to the closed end vacuum chamber 52. Likewise, the open end of vacuum chamber 54 is rotated in a direction away from the open end of vacuum chamber 52 towards the machine reel. By arranging vacuum chambers 52 and 54 in the aforementioned described orientation, the amount of tape contacting capstan 102 is maximized. By maximizing the wrap on the capstan, tape slippage relative to the capstan is significantly reduced. It is worthwhile noting that by positioning the vacuum column at dissimilar angles relative to the tape threading path the vacuum column is maintained at an optimum length to allow high performance tape transport drive to be packaged in a standardized mounting frame.

Still referring to FIGS. 1 and 2, second guide means 104 is positioned with its surface in linear alignment with entry side 106 of vacuum chamber 52. First spacer means 108 is positioned between the second guide means and the entry side 106 to form a contiguous surface against which the tape is guided into the vacuum chamber 52. Although a plurality of means can be used for second guide means 104 in the preferred embodiment of this invention, a roller guide with spaced apart guide flanges is used.

Positioned between exit side 110 of vacuum chamber 52 and capstan 102 is an arcuate tape path identified as processing station 112. Magnetic transducer 114 is positioned at the processing station. The magnetic transducer is used for reading and writing magnetic data onto the oxide surface of magnetic media 58. A pair of air bearing channel guides 116 and 118, respectively, are positioned on either side of the magnetic transducer. When pressure is applied to the guides via tubing means 120 and 122 respectively, the tape flies relative to the surface of the guides. Spaced apart flanges are positioned on the edges of the guide for guiding the tape about the head region. Lateral movement of the tape is controlled by the flanges on the guide. The tape cleaner, the end of tape (EOT) sensor, and the beginning of tape (BOT) sensors are packaged in element 124 which is mounted along the arcuate tape path. Spacer means 126 is positioned between exit side 110 and channel guide 116. Similarly, spacer means 128 is positioned between channel guide 118 and capstan 102 while spacer means 130 is positioned between spacer means 128 and the entry side of vacuum chamber 54. Third guide means 132, which may be of a type substantially identical to the second guide means is positioned so that its guiding surface is in linear alignment with the surface of the exit side from vacuum chamber 54. Spacer means 134 is interposed between the exit surface and third guide means. By positioning the processing station out of the tape threading path, the ease of maintaining automatic threading characteristic, on the tape transport unit according to the present invention, is significantly improved. Also, since the magnetic transducer is not within the tape threading path, contamination of the head which is generally due to dirt and foreign debris on the tape leader is significantly reduced.

Still referring to FIGS. 1 and 2, door 136 which may be transparent as is in the preferred embodiment of the present invention and defined by the heavy outline in the drawings is mounted to elongated hinge means 138 by a plurality of fastening means 140. Fastening means 142 which may be screws are used to attach the free side of the door to the mounting frame 12. By torquing the mounting screws in a clockwise direction, a sealed cavity is generated between the cover and the mounting frame. A plurality of vent holes 144 are drilled in the door and along the tape threading path. By positioning the holes along the tape threading path, atmospheric pressure which is necessary for loading the tape into the vacuum column and to maintain proper operation of the tape transport unit is achieved. Also, excess air which is generated when the air jets are forcing the tape through the threading path is free to escape through the vent holes. The manual machine functions such as start, stop, etc. are obtained by push buttons which are located on the push button panel 146.

OPERATION

In operation an operator mounts the file reel onto spindle 16. In the case of a semi-automatic threading device as is shown in FIG. 2, the operator rotates the file reel until the leading end of the tape is positioned within nip 63. If the device is automatic (that is self threading) as is shown in FIG. 1, the operator aligns the locating projection 26 with receiving notch 28. The locating position activates the sensing means (not shown). At this point the logic in the system is aware of the fact that a cartridge is seated on spindle 16. The opening mechanism 30 is activated and the wraparound cartridge is next opened. The cartridge is held by restraining means 32 and 34, respectively. Air is then forced into the cartridge and the leading end of magnetic tape 58 is then forced to propel or uncoil from the file reel over the first guide means 60 into the first portion of the tape threading path. The tape, aided by gravity and the angled air jets, is forced along the tape threading path until it attaches to the take-up reel 36. As the tape attaches to the take-up reel it moves laterally towards the vacuum chambers. This movement tends to seal off the open ends of the vacuum and increases the effectiveness of the vacuum in said chambers. Simultaneously, atmospheric pressure which is achieved by the vent holes 144 allows the pressure that is on one side of the tape to be substantially equivalent to atmospheric while the pressure on the other side of the tape is substantially lower than atmospheric. It is worthwhile noticing that a file reel not having a cartridge can be loaded into the above described automatic tape transport unit.

Following the attachment of the tape, the vacuum to the machine reel is transported to the vacuum columns. The difference in pressure on either side of the tape forces the tape to form loops 96 and 98 into the vacuum column. This completes the detailed description of the device.

While the preferred embodiment is described, variation and modifications will occur to those skilled in the art while they become familiar with the principles of the disclosed invention. This being the case it is intended that the appended claims shall be construed to embody all such variations and modifications as fall within the true spirit and scope of this invention.

What is claimed is:

1. Transport for positioning a flexible media comprising in combination:
   a mounting frame;
   a rotatable file reel having a first axis of rotation operably mounted on said mounting frame;
   a rotatable machine reel having a second axis of rotation, mounted so that the first axis of rotation and the second axis of rotation for the file reel and the machine reel are being positioned on a diagonal line;
   a vertical channel positioned so as to define a media threading path between the file reel and the machine reel;
   a pair of vacuum chambers having a closed end and an opened end with the opened end positioned adjacent to the media threading path and a pair of major axes running between the closed end of each vacuum chamber whereby the axes are inclined at different angles with respect to the media threading path and each other;
   a processing station positioned on said mounting frame located out of said media threading path and located for operation on said media on a plane approximately parallel to a first major axes of a first of said vacuum chambers and approximately on a same plane with one wall of the first of said vacuum chambers; and
   a capstan positioned intermediate said processing station and a second of said vacuum chambers.

2. In a high performance tape transport device wherein a length of magnetic media is transported by a single drive capstan past a processing station the improvement comprising in combination:
   a file reel for supplying the magnetic media;
   a machine reel adaptable to receive said media; said machine reel being positioned on a diagonal axis from the file reel;
   a tape threading path positioned so as to interconnect the file reel with the machine reel; said tape threading path being positioned so that a length of media is urged therethrough by gravitational force;
   a first vacuum chamber positioned at an inclined angle to the tape threading path; said first vacuum chamber being operable to accept a first loop of said media; and
   a second vacuum chamber positioned at an inclined angle to the tape threading path and to said first vacuum chamber; said second vacuum chamber being operable to accept a second loop of said media;
   said processing station located adjacent said first vacuum chamber on an approximate plane with an exit wall of said first vacuum chamber.

3. The device claimed in claim 2 further including a first guide means operable for guiding the media into the first vacuum chamber; and a second guide means operable for guiding the media out of the second vacuum chamber.

4. A self threading tape transport device comprising in combination:
   a mounting frame;
   a first file spindle mounted to said frame and operable for driving a file reel;
   automatic tape handling means arranged about the first file spindle and operable to thread a length of tape;
   a second machine spindle mounted to the frame; said machine spindle adapted for driving a machine reel and positioned diagonally from the first file spindle;
   a vertical tape threading path interconnecting the file spindle and the machine spindle;
   a first vaccum chamber positioned at an inclined angle to the tape threading path; said first vacuum chamber being operable to accept a first loop of said media;
   a second vacuum chamber positioned at an inclined angle to the tape threading path and to said first vacuum chamber; said second vacuum chamber being operable to accept a second loop of said media;
   a capstan;
   a tape processing path positioned between said first vacuum chamber and said capstan out of said vertical tape threading path and on an approximate plane with an exit wall of said first vacuum chamber; and
   a transducing means positioned in the tape processing path and operable to write/read data on the tape.

* * * * *